(12) United States Patent
Schoenblum et al.

(10) Patent No.: US 6,411,602 B2
(45) Date of Patent: *Jun. 25, 2002

(54) METHOD AND APPARATUS FOR DETECTING AND PREVENTING BANDWIDTH OVERFLOW IN A STATISTICAL MULTIPLEXER

(75) Inventors: Joel Schoenblum, Roswell; Si Jun Huang, Suwanee, both of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/774,834

(22) Filed: Jan. 31, 2001

Related U.S. Application Data

(60) Division of application No. 09/228,029, filed on Jan. 8, 1999, which is a continuation-in-part of application No. 08/823,007, filed on Mar. 21, 1997, now Pat. No. 6,052,384.

(51) Int. Cl.[7] .............................................. G01R 31/08

(52) U.S. Cl. ....................................... 370/232; 370/468

(58) Field of Search ................................. 370/232, 252, 370/468–477, 487, 391, 537, 444, 535, 321, 387; 725/216, 240.01, 112–118, 130, 267; 712/200

(56) References Cited

U.S. PATENT DOCUMENTS

| 5,594,729 | A | * | 1/1997 | Kanakia et al. ............. 370/391 |
| 5,675,384 | A | * | 10/1997 | Ramamurthy et al. . 375/240.04 |
| 5,877,612 | A | * | 3/1999 | Krayse et al. ......... 375/240.25 |
| 5,956,088 | A | * | 9/1999 | Shen et al. ............ 375/340.25 |
| 6,044,396 | A | * | 3/2000 | Adams ....................... 709/217 |
| 6,052,384 | A1 | * | 4/2001 | Haung et al. ............... 370/468 |
| 6,240,103 | B1 | * | 5/2001 | Schoenblum et al. ....... 370/468 |

* cited by examiner

Primary Examiner—Kwang Bin Yao
Assistant Examiner—Prenell Jones
(74) Attorney, Agent, or Firm—Kenneth M. Massaroni; Kelly A. Gardner; Hubert J. Barnhardt, III

(57) ABSTRACT

Techniques for determining an output rate for a bit stream, the output rate being determined by applying information read from the bit stream to available bandwidths. The techniques are employed to construct a statistical multiplexer 80 that multiplexes varying bit-rate bit streams. Minimum and maximum output rates for each bit stream are determined such that neither a queue for the bit stream in the multiplexer nor the bit stream's decoder will underflow or overflow. The multiplexer first allocates each bit stream its minimum bandwidth and then allocates any remaining bandwidth to the bit streams in proportion to the difference between the minimum and maximum output rates for the bit streams, with no bit stream receiving more than its maximum output rate. If there is not enough bandwidth to give every bit stream its minimum rate, glue frames may be inserted, or low priority channels dropped.

13 Claims, 7 Drawing Sheets

METHOD AND APPARATUS FOR DETECTING AND PREVENTING BANDWIDTH OVERFLOW IN A STATISTICAL MULTIPLEXER

CROSS REFERENCE TO RELATED APPLICATIONS

This application is a division of Ser. No. 09/228,029, filed Jan. 8, 1999, which is a continuation in part application of U.S. application Ser. No. 08/823,007, filed Mar. 21, 1997, now U.S. Pat. No. 6,052,384 by Huang, et al, entitled "Using a Receiver Model to Multiplex Variable-Rate Bit Streams Having Timing Constraints," and assigned to Scientific-Atlanta, Inc.

FIELD OF THE INVENTION

The invention relates in general to the transmission of variable-rate bit streams and more particularly to detecting and preventing imminent bandwidth overflow.

BACKGROUND OF THE INVENTION

A new problem in data transmission is the transmission of data that requires a high band width, is bursty, and has temporal constraints. Traditionally, data transmission has been done on the public switched networks provided by the telephone companies or on packet networks. The public switched networks are designed for interactive voice applications and so provide relatively low-bandwidth circuits that satisfy stringent temporal constraints. The packet networks are designed for the transfer of data between computer systems. The only constraint is that the data eventually arrive at its destination. The amount of bandwidth available for a transfer depends on the degree of congestion in the network. The packet networks thus typically make no guarantees about when or even in what order the data in a burst of data will arrive at its destination.

It may thus be appreciated that neither the telephone network nor the packet network is well-adapted to handle high-bandwidth, bursty data with time constraints. An example of such data is digital television which has been compressed according to the Motion Picture Experts Group ("MPEG") MPEG-2 standard, otherwise set forth in ISO/IEC 13818-1 and 13818-2.

Referring now to FIG. 1 there is illustrated therein those details of the MPEG-2 standard that are required for an understanding of the present invention. The MPEG-2 standard defines an encoding scheme for compressing digital representations of video. The encoding scheme takes advantage of the fact that video images generally have large amounts of spatial and temporal redundancy. There is spatial redundancy because a given video picture has sections where the entire area has the same appearance; the larger the areas and the more of them there are, the greater amount of spatial redundancy in the image. There is temporal redundancy because there is often not much change between a given video image and the ones that precede and follow it in a sequence. The less the amount of change between two video images, the greater the amount of temporal redundancy. The more spatial redundancy there is in an image and the more temporal redundancy there is in the sequence of images to which the image belongs, the fewer the bits of information that will be needed to represent the image.

Maximum advantage for the transmission of images encoded using the MPEG-2 standard is obtained if the images can be transmitted at variable bit rates. The bit rates can vary because the rate at which a receiving device receives images is constant, while the images have a varying number of bits. A large image therefore requires a higher bit rate than a small image, and a sequence of MPEG images transmitted at variable bit rates is a variable-rate bit stream with time constraints. For example, a sequence of images that shows a news anchorperson in front of a solid color background will have much more spatial and temporal redundancy than a sequence of images for a commercial or MTV song presentation, and the bit rate for the images showing the news anchor will be far lower than the bit rate for the images of the MTV song presentation.

The MPEG-2 compression scheme presents a sequence of video images as a sequence of compressed pictures, each of which must be decoded at a specific time. There are three ways in which pictures may be compressed. One way is intra-coding, in which the compression is done without reference to any other picture. This encoding technique reduces spatial redundancy but not time redundancy, and the pictures resulting from it are generally larger than those in which the encoding reduces both spatial redundancy and temporal redundancy. Pictures encoded in this way are called I-pictures. A certain number of I-pictures are required in a sequence, first, because the initial picture of a sequence is necessarily an I-picture, and second, because I-pictures permit recovery from transmission errors.

Time redundancy is reduced by encoding pictures as a set of changes from earlier or later pictures or both. In MPEG-2, this is done using motion compensated forward and backward predictions. When a picture uses only forward motion compensated prediction, it is called a Predictive-coded picture, or P picture. When a picture uses both forward and backward motion compensated predictions, it is called a bi-directional predictive-coded picture, or a B picture for short. P pictures generally have fewer bits than I-pictures and B pictures have the smallest number of bits. The number of bits required to encode a given sequence of pictures in MPEG-2 format is thus dependent on the distribution of picture coding types mentioned above, as well as the picture content itself. As will be apparent from the foregoing discussion, the sequence of pictures required to encode the images of the news anchorperson will have fewer and smaller I-pictures and smaller B and P pictures than the sequence required for the MTV song presentation, and consequently, the MPEG-2 representation of the images of the news anchorperson will be much smaller than the MPEG-2 representation of the images of the MTV sequence.

The MPEG-2 pictures are being received by a low-cost consumer electronics device such as a digital television set or a set-top box provided by a cable television ("CATV") service provider. The low cost of the device strictly limits the amount of memory available to store the MPEG-2 pictures. Moreover, the pictures are being used to produce moving images. The MPEG-2 pictures must consequently arrive in the receiver in the right order and with time intervals between them such that the next MPEG-2 picture is available when needed and there is room in the memory for the picture which is currently being sent. In the art, a memory which has run out of data is said to have underflowed, while a memory which has received more data than it can hold is said to have overflowed. In the case of underflow, the motion in the TV picture must stop until the next MPEG-2 picture arrives, and in the case of overflow, the data which did not fit into memory is simply lost.

FIG. 1 is a representation of a system 10 including digital picture source 12 and a television 14 that are connected by a channel 16 that is carrying a MPEG-2 bit stream representation of a sequence of TV images. The digital picture source 12 generates uncompressed digital representations ("UDR") of images 18, which go to variable bit rate ("VBR") encoder 20. Encoder 20 encodes the uncompressed digital representations to produce a variable rate bit stream ("VRBS") 22. Variable rate bit stream 22 is a sequence of compressed digital pictures 24(a . . . n) of variable length. As indicated above, when the encoding is done according to the MPEG-2 standard, the length of a picture depends on the complexity of the image it represents and whether it is an I-picture, a P picture, or a B picture. Additionally, the length of the picture depends on the encoding rate of VBR encoder 20. That rate can be varied. In general, the more bits used to encode a picture, the better the picture quality.

The variable rate bit stream 22 is transferred via channel 16 to VBR decoder 26, which decodes the compressed digital pictures 24(a . . . n) to produce uncompressed digital pictures 28. These in turn are provided to television 14. If television 14 is a digital television, they will be provided directly; otherwise, there will be another element which converts uncompressed digital pictures ("UDP") 28 into standard analog television signals and then provides those signals to television 14. There may of course be any number of VBR decoders 26 receiving the output of a single encoder 20.

In FIG. 1, channel 16 transfers bit stream 22 as a sequence of packets 30. The compressed digital pictures 24 thus appear in FIG. 1 as varying-length sequences of packets 30. Thus, picture 24(a) may have "n" packets while picture 24(n) has "k" packets. Included in each picture 24 is timing information 32. Timing information contains two kinds of information: clock information and time stamps. Clock information is used to synchronize decoder 26 with encoder 20. The MPEG-2 specification refers to this clock information as the Program Clock Reference ("PCR"). The time stamps include the Decoding Time Stamp ("DTS") which specifies when a picture is to be decoded and the Presentation Time Stamp ("PTS") which specifies when it is actually to be displayed. The times specified in the time stamps are specified in terms of the clock information. As indicated above, VBR decoder 26 contains a relatively small amount of memory for storing pictures 24 until they are decoded and provided to TV 14. This memory is shown at 34 in FIG. 1 and will be referred to hereinafter as the decoder's bit buffer. Bit buffer 34 must be at least large enough to hold the largest possible MPEG-2 picture. Further, channel 16 must provide the pictures 24 to bit buffer 34 in such fashion that decoder 26 can make them available at the proper times to TV 14 and that bit buffer 34 never overflows or underflows. Bit buffer 34 underflows if not all of the bits in a picture 24 have arrived in bit buffer by the time specified in the picture's time stamp for decoder to begin decoding the picture.

Providing pictures 24 to VBR decoder 26 in the proper order and at the proper times is made more complicated by the fact that a number of channels 16 may share a single very high bandwidth data link. For example, a CATV provider may use a satellite link to provide a large number of TV programs from a central location to a number of CATV network head ends, from which they are transmitted via coaxial or fiber optic cable to individual subscribers or may even use the satellite link to provide the TV programs directly to the subscribers. When a number of channels share a medium such as a satellite link, the medium is said to be multiplexed among the channels.

FIG. 2 shows such a multiplexed medium. A number of channels 16(0) through 16(n) which are carrying packets containing bits from variable rate bit streams 22 are received in multiplexer 40, which processes the packets as required to multiplex them onto high bandwidth ("HBW") medium 42. The packets then go via medium 42 to demultiplexer 44, which separates the packets into the packet streams for the individual channels 16 (0 . . . n). A simple way of sharing a high bandwidth medium among a number of channels that are carrying digital data is to repeatedly give each individual channel 16 access to the high bandwidth medium for a short period of time, referred to hereinafter as a slot.

One way of doing this is shown at 50 in FIG. 2. The short period of time appears at 50 as a slot 52; during a slot such as slot 52(0), a fixed number of packets 30(0 . . . n) belonging to a channel 16 may be output to medium 42. Each channel 16 in turn has a slot 52, and all of the slots taken together make up a time slice 54. When medium 42 is carrying channels like channel 16 that have varying bit rates and time constraints, slot 52 for each of the channels 16 must output enough packets to provide bits at the rate necessary to send the largest pictures to channel 16 within channel 16's time, overflow, and underflow constraints. Of course, most of the time, a channel's slot 52 will be outputting fewer packets than the maximum to medium 42, and sometimes may not be carrying any packets at all. Since each slot 52 represents a fixed portion of medium 42's total bandwidth, any time a slot 52 is not full, a part of medium 42's bandwidth is being wasted.

In order to avoid wasting the medium bandwidth, a technique is used which ensures that each time slice is generally almost full of packets. This technique is termed statistical multiplexing. It takes advantage of the fact that at a given moment of time, each of the channels in a set of channels will be carrying bits at a different bit rate, and the medium bandwidth need only be large enough at that moment of time to transmit what the channels are presently carrying, not large enough to transmit what all of the channels could carry if they were transmitting at the maximum rate. The output of the channels is analyzed statistically to determine what the actual maximum rate of output for the entire set of channels will be and the medium bandwidth is sized to satisfy that actual peak rate. Typically, the bandwidth that is determined in this fashion will be far less than is required for multiplexing in the manner shown at 55 in FIG. 2. As a result, more channels can be sent in a given amount of bandwidth. At the level of slots, what statistical multiplexing requires is a mechanism which in effect permits a channel to have a slot in time slice 54 which varies in length to suit the actual needs of channel 16 during that time slice 54. Such a time slice 54 with varying-length slots 56 is shown at 55.

Methods of statistically multiplexing bit streams are disclosed in, for example, U.S. Pat. No. 5,506,844, entitled, Method for Configuring a Statistical Multiplexer to Dynamically Allocate Communication Channel Bandwidth, to Rao, issued Apr. 9, 1996; U.S. patent application Ser. No. 08/823,007 entitled Using a Receiver Model to Multiplex Variable Rate Bit Streams Having Timing Constraints, filed Mar. 21, 1997, the disclosures of each of which are incorporated herein by reference.

While the methods of statistically multiplexing bits streams disclosed in the referenced patents and applications all perform in an adequate manner, there are certain limitations that have come to light. For example, while the Rao patent does disclose a way to maximize the degree to which the Medium's bandwidth is used, it has a number of shortcomings, perhaps the most important of which relates to the fact that it adjusts the multiplexing by changing picture quality. A second shortcoming relates to the fact that it teaches encoders that encode digital images as piece-wise constant bit streams. These bit streams have a lower degree of compression that variable-rate bit streams.

The limitations inherent in the '007 application relate to the fact that while the multiplexer output bandwidth is a fixed constant, the bit rates required of all the channel bit streams changes each time slice to satisfy various requirements of the bit stream, decoder and multiplexer. Each time slice, each of the channels is allocated a portion of the total output of the multiplexer bandwidth. Accordingly, the bit rate allocation is essentially static, and cannot prevent the condition where the sum of the bit rates required by all the channel bit streams for a time slice is greater than the output bandwidth of the multiplexer, a "bandwidth overflow" condition. Likewise, in the prior art the problems associated with bandwidth overflow are dealt with by replacing non-anchor pictures in the MPEG-2 bit stream (e.g., a B picture in an I-B-P sequence, or any I-picture in an all I-picture sequence) with smaller "glue" pictures. While this is an important innovation, it does not alone guarantee the total bandwidth requirements of all channels during a particular time slice will be less than the available output bandwidth of the multiplexer (i.e., does not guarantee prevention of a bandwidth overflow condition). Nor does it provide any means of detecting when overflow is imminent, and which pictures in which channels will be effected.

Accordingly, there exists a need for an improved method of handling potential bandwidth overflow situations. Such an improved method should not only improve allocation of bandwidth, but should also better anticipate imminent bandwidth overflow, and the channels likely effected. All this should also be accomplished without compromising overall effectiveness of the multiplexer.

DETAILED DESCRIPTION OF THE PREFERRED EMBODIMENT

Figure 1:
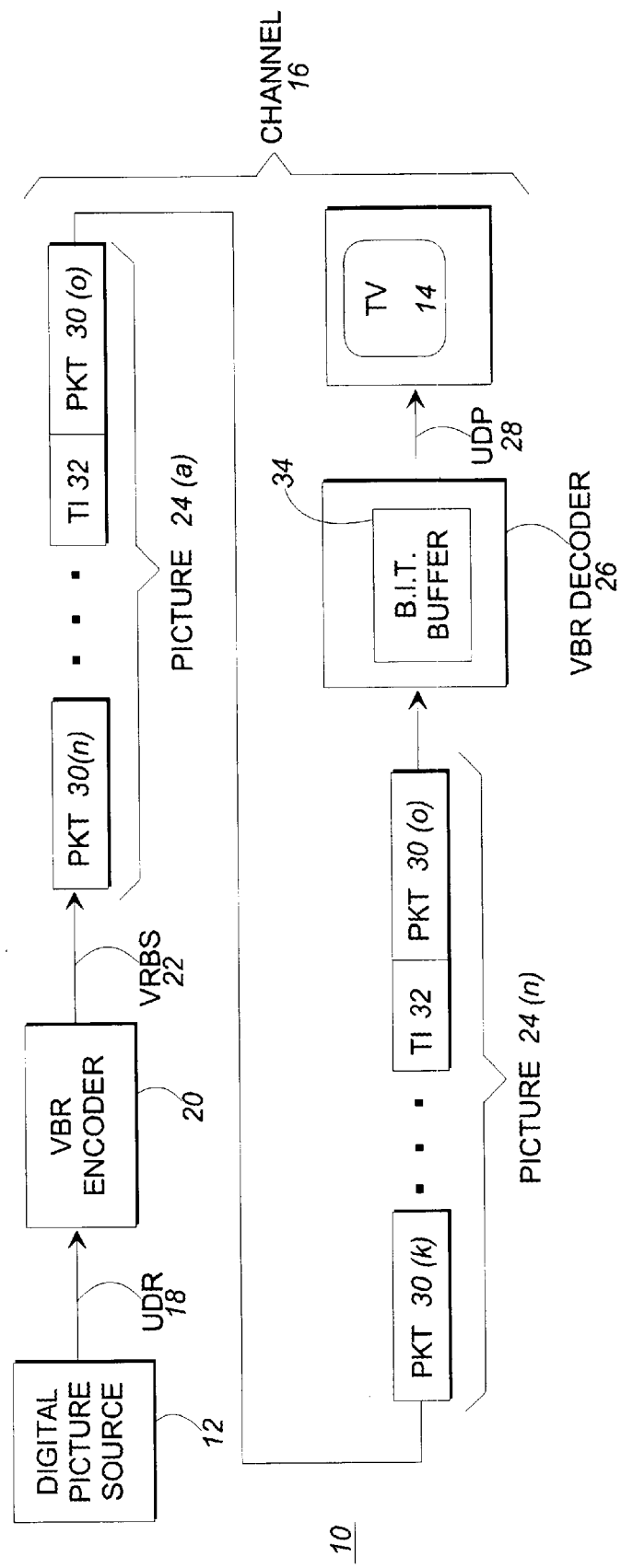
FIG. 1 is a block diagram illustrating how digital television pictures are encoded, transmitted, and decoded.
Figure 2:
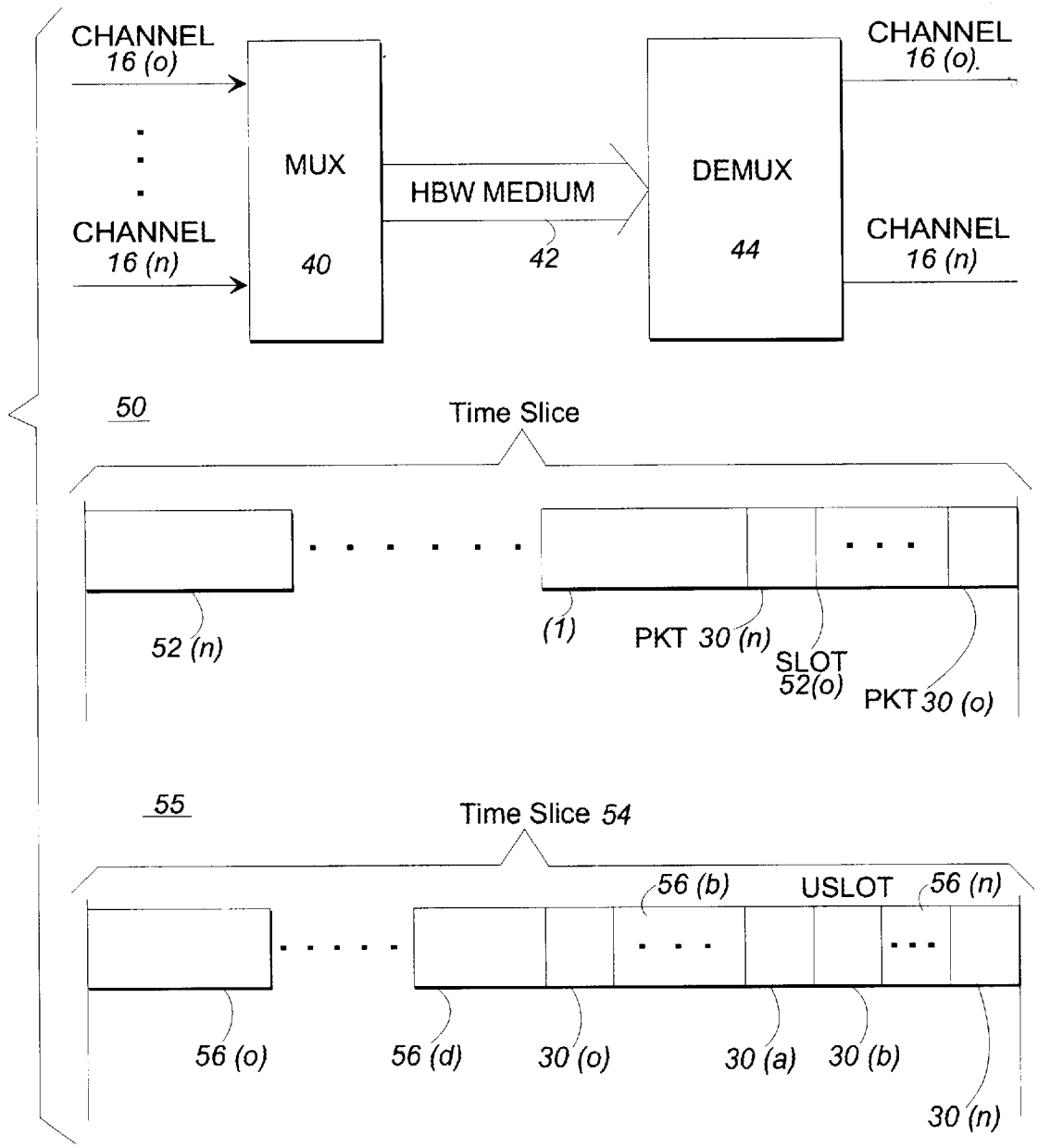
FIG. 2 is a block diagram showing multiplexing of variable-rate bit streams onto a high band width medium.

While the specification concludes with claims defining the features of the invention that are regarded as novel, it is believed that the invention will be better understood from a consideration of the following description in conjunction with the drawing figures, in which like reference numerals are carried forward.

At its simplest, the invention relates to the ability to look ahead "n" time slices to see whether or not the system will have sufficient bandwidth to accommodate the video information that will need to be output. The process described hereinbelow looks at the relative space needs per channel and allocates bits (in MPEG packets) as required. By looking a sufficient number of time slices into the future, panic conditions, i.e., a condition in which bandwidth requirements will exceed bandwidth availability, can be identified. Once identified, such conditions may be avoided by looking for opportunities to insert glue pictures, as described below.

Figure 3:
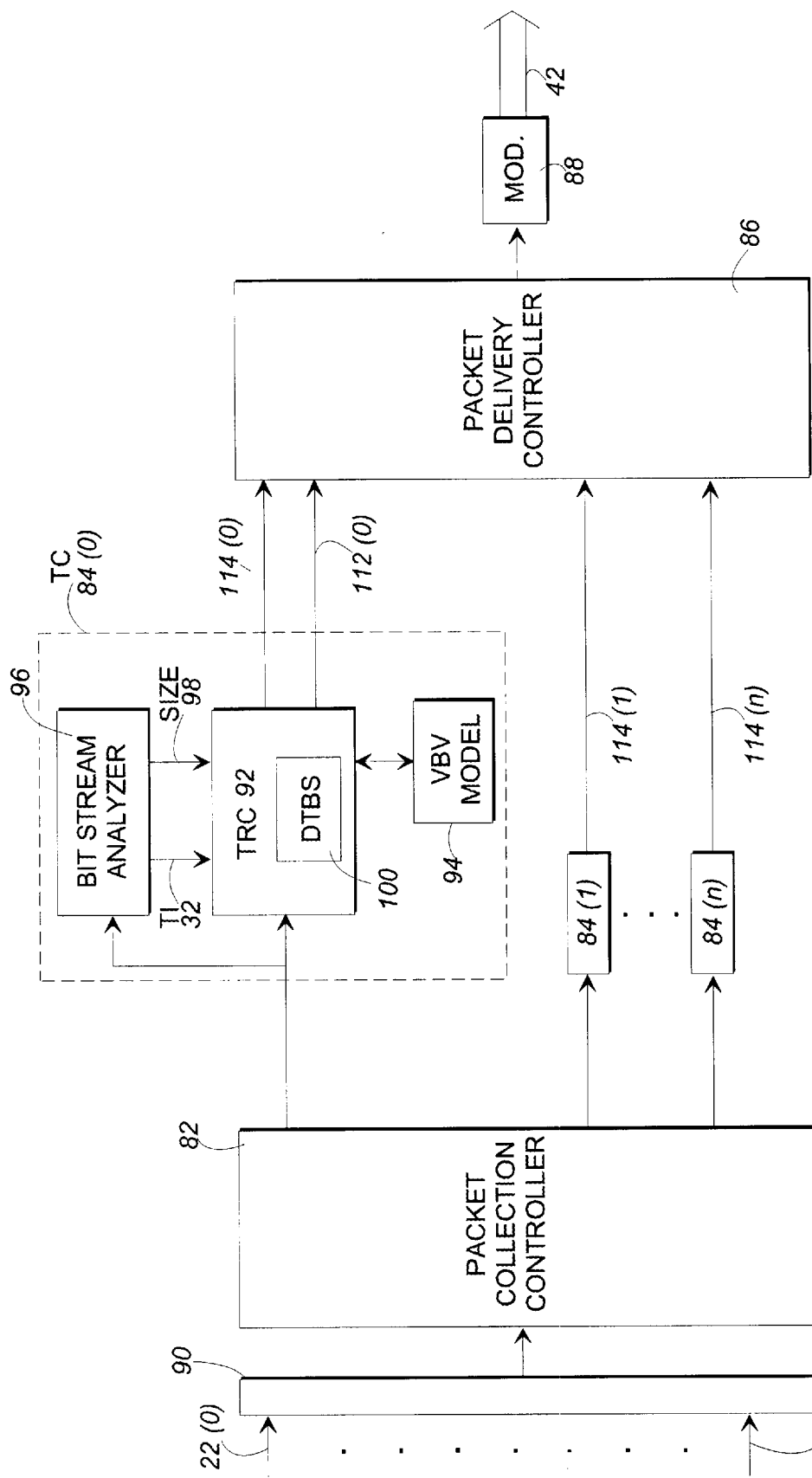
FIG. 3 is a block diagram of a statistical multiplexer which implements a preferred embodiment of the invention.

Referring now to FIG. 3, there is illustrated therein block diagram of a statistical multiplexer 80 for MPEG-2 bit streams which is implemented according to the principles of the invention. The main components of multiplexer 80 are packet collection controller 82, a transmission controller ("TC") 84(0) for each variable-rate bit stream 22(0), a packet delivery controller 86, and a modulator 88, which receives the output of packet delivery controller 86 and outputs it in the proper form for transmission medium 42.

Packet collection controller 82 collects packets from variable-rate bit streams 22 (0 . . . $n$) and distributes the packets that carry a given bit stream 22(0) to the bitstream's corresponding transmission controller 84(0). In the preferred embodiment, the packets for all of the bit streams 22 (0 . . . $n$) are output to bus 90. Each packet contains an indication of which bit stream it belongs to, and packet collection controller responds to the indication contained in a packet by routing it to the proper transmission controller. It should be noted here that the packets in each bit stream 22($i$) arrive in transmission controller in the order in which they were sent by encoder.

The transmission controller 84($i$) determines the rate at which packets from its corresponding bit stream 22 is output to medium 42. The actual rate determination is made by transmission rate controller ("TRC") 92, which at a minimum, bases its determination on the following information: for at least a current picture in bit stream 22(0), the timing information 32 and the size of the current picture. A Video Buffer Verifier (VBV) model 94, which is a model of a hypothetical bit buffer. VBV model 94 uses the timing information and picture size information to determine a range of rates at which bit stream 22 must be provided to the decoder's bit buffer 34 if bit buffer 34 is to neither overflow nor underflow. Transmission rate controller 92 provides the rate information to packet delivery controller 86, which uses the information from all of the transmission controllers 84 (0 . . . $n$) to determine during each time slice how the bandwidth of transmission medium 42 should be allocated among the bit streams 22 during the next time slice. The more packets a bit stream 22 needs to output during a time slice, the more bandwidth it receives for that time slice.

Continuing in more detail, transmission controller 84 obtains the timing and picture size information by means of bit stream analyzer 96, which reads bit stream 22($i$) as it enters transmission controller 84 and recovers the timing information 32 and the picture size 98 from bit stream 22. Bit stream analyzer 96 can do so because the MPEG-2 standard requires that the beginning of each picture 24 be marked and that the timing information 32 occupy predetermined locations in each picture 24. As previously explained, timing information 32 for each picture 24 includes a clock value and a decoding time stamp ("DTS"). Transmission controller 84 and later decoder 26 use the clock value to synchronize themselves with encoder 20. The timing information is found in the header of the Packetized Elementary Stream ("PES") packet that encapsulates the compressed video data. The information is contained in the PTS and DTS time stamp parameters of the PES header. The MPEG-2 standard requires that a time stamp be sent at least every 700 milliseconds (msec). If a DTS is not explicitly sent with a compressed picture, then the decoding time can be determined from parameters in the Sequence and Picture headers, or extrapolated from the DTS value of a previously transmitted picture. For details, see Annex C of ISO/IEC 13818-1. Bit stream analyzer 96 determines the size of a picture simply by counting the bits (or packets) from the beginning of one picture to the beginning of the next picture.

The timing information and the picture size are used in VBV model 94. VBV model 94 requires the timing information and picture size information for each picture in bit stream 22 from the time the picture enters multiplexer 80 until the time the picture is decoded in decoder 26. The DTS buffer 100 must be large enough to hold the timing information for all of the pictures required for the model. It should be noted here that VBV model 94 behavior is defined solely by the semantics of the MPEG-2 standard, not by any concrete bit buffer 34. Any bit buffer for a working MPEG-2 decoder must be able to provide the decoder with the complete next picture at the time indicated by the picture's timing information; that means that the bit buffer 34 for any working MPEG-2 decoder must be at a minimum large enough for the largest possible MPEG-2 picture. Given this minimum buffer size, the timing information for the pictures, and the sizes of the individual pictures, VBV model 94 can determine a rate of output for bit stream 22 which will guarantee for bit buffers 34 of any working MPEG-2 decoder that each picture arrives in the bit buffer 34 before the time it is to be decoded and that there will be no overflow of bit buffer 34.

Figure 4:
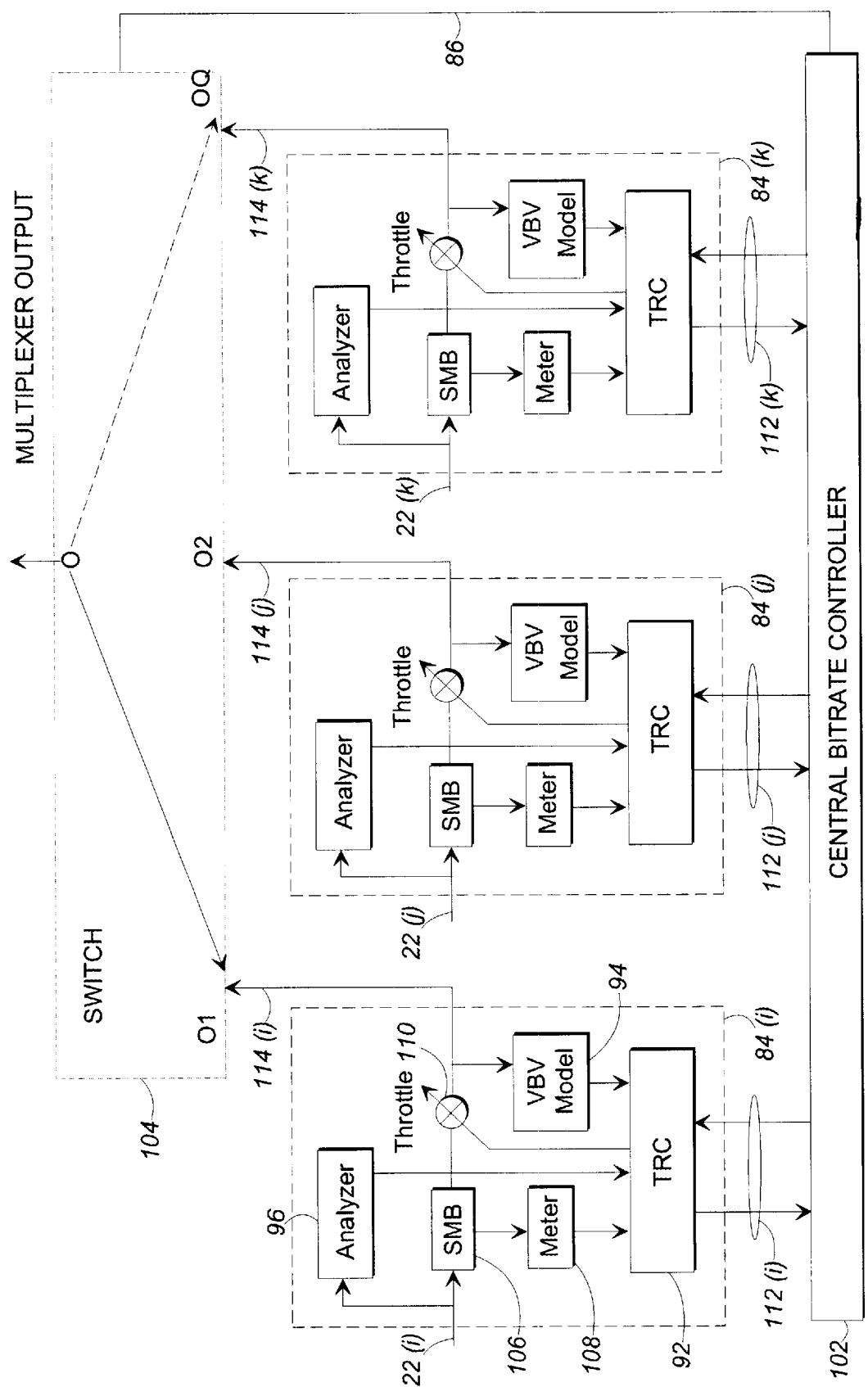
FIG. 4 is a more detailed block diagram of a part of the statistical multiplexer of FIG. 3.

FIG. 4 shows the details of a preferred embodiment of transmission controller 84 (*i* . . . *k*) and packet delivery controller 86. The figure shows three of the n transmission controllers, namely transmission controllers 84(*i*), (*j*), (*k*), and the two major components of packet delivery controller 86, namely central bit rate controller 102 and switch 104. Beginning with transmission controller 84(*i*), in addition to transmission rate controller 92, analyzer 96, and VBV model 94, transmission controller includes statistical multiplexer buffer (SMB) 106, a meter 108 for buffer 106, and throttle 110. It is to be noted that while only three transmission controllers (i, j and k) are illustrated, the invention is not so limited. Any number of transmission controllers may be employed. Likewise, as each transmission controller is essentially the same, only one, 84(*i*) will be described in detail.

SMB 106 is a first-in-first-out pipe buffer which holds the bits of bit stream 22(*i*) while they are in transmission controller 84(*i*). In the preferred embodiment, SMB 106 receives pictures 24 (in FIG. 1) in bursts that contain all or almost all of the bits in the picture, depending on the picture size and maximal bit rate specified by the encoder. Such bursts are termed herein picture pulses, and the time period represented by such a picture pulse is denoted as $T_p$, which is the inverse of video frame rate. For example, $T_p$ =1/29.97=3 milliseconds (msec) for NTSC video coding. As previously stated, packet delivery controller 86 provides packets in time slices 54. The length of time of one of these slices is denoted herein as $T_c$. In one preferred embodiment, $T_c$ is 10 msec.

SMB 106 must of course be large enough to be able to accept picture pulses of any size during the time it takes to read out the largest expected picture pulse. SMB 106 further must be emptied at a rate that ensures that it cannot overflow, since that would result in the loss of bits from bit stream 22(*i*). It also should not underflow, since that would result in the insertion of null packets in the bit stream, resulting in the waste of a portion of the multiplexed medium. Meter 108 monitors the fullness of SMB 106 and provides information concerning the degree of fullness to TRC 92. TRC 92 then uses this information to vary the range of bit rates that it provides to packet delivery controller 86 as required to keep SMB 106 from overflowing or underflowing. Throttle 110, finally, is set by TRC 92 on the basis of information 112(*i*) that it has received from packet delivery controller 86 to indicate the number of packets 30 that bit stream 22(*i*) is to provide to medium 42 in time slice 54.

In determining the range, TRC 92 sets the minimum rate for a given time slice 54 to the maximum of the rate required to keep SMB 106 from overflowing and the rate required to keep VBV model 94 from underflowing and the maximum rate for the time slice to the minimum of the rate required to keep SMB 106 from underflowing and the rate required to keep VBV model 94 from overflowing. Continuing with packet delivery controller 86, packet delivery controller 86 allocates the packets 30 that can be output during the time slice 54 $T_c$ to bit streams 22(*i* . . . *n*) as required to simultaneously satisfy the ranges of rates and priorities provided by TRC 92 for each transmission controller 84 and maximize the number of packets 30 output during time slice 54. In the preferred embodiment, controller 86 has two components, central bit rate controller 102, which is an algorithm which executes on a processor that analyzes the information received from each of the transmission rate controllers 92 in order to determine how many packets from each bit stream are to be output in the next time slice 54, and switch 104, which takes the number of packets 30 permitted by throttle 110 for each bit stream during the time slice 54. Switch 104 is implemented so as to deliver packets from each throttle such that the packets are evenly distributed across time slice 54. Implementing switch in this way reduces the burstiness of the stream of packets to decoder and thereby reduces the amount of transport packet buffer needed in decoder 26. Such implementations of switch 104 are well-known in the art.

An important advantage of multiplexer 80, or indeed of any statistical multiplexer built according to the principles of the invention is that the multiplexer can simultaneously multiplex both constant-rate and variable-rate bit streams onto medium 42. The reason for this is that as far as statistical multiplexer 80 is concerned, a constant-rate bit stream is simply a degenerate case: it is a varying-rate bit stream whose rate never varies. Thus, with a constant-rate bit stream, TRC 92(*i*) always returns the same rate information 114(*i*) to packet delivery controller 86.

Figure 5:
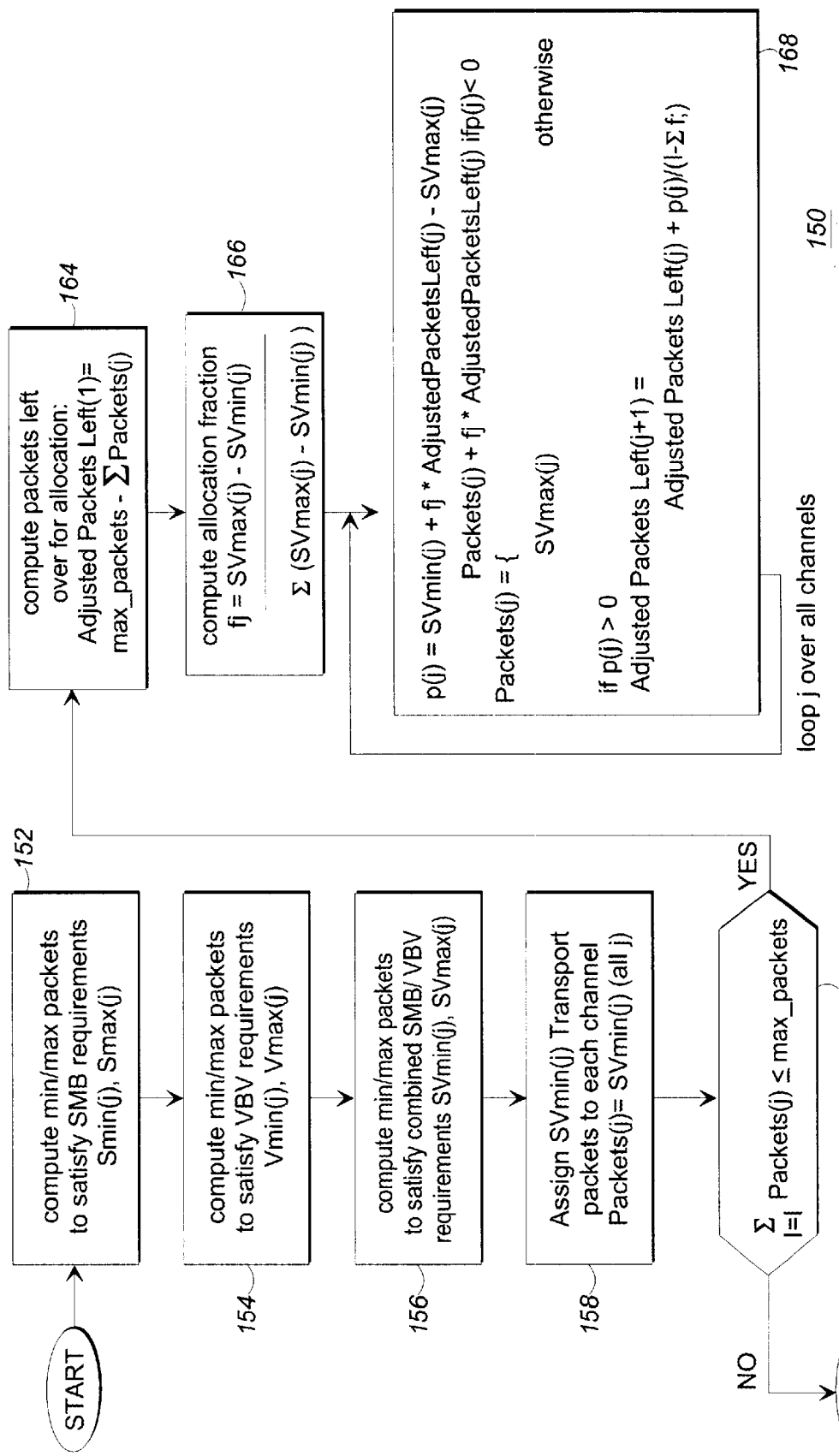
FIG. 5 is flow diagram illustrating the algorithm used to allocate the total multiplexer bandwidth for a particular time period, in accordance with the instant invention.

Referring now to FIG. 5 there is illustrated therein a flow diagram of the algorithm used to allocate the total multiplexer bandwidth for a particular time slice, in accordance with the instant invention. The flow diagram 150 illustrates the algorithm used to allocate the total statistically multiplexed bandwidth to each of the channels for a particular time slice. The allocation is in the form of a number of transport packets (TP) for each of the channels. A time slice is the time period $T_c$ over which each of the channels will empty out the allocated packets from the SMB, (for example SMB 106 of FIG. 4), and through the switch for the output of the multiplexer. Accordingly, "Packets$_{(i)}$" hereinbelow will refer to the number of transport packets allocated to a channel "i" for a particular time slice, and ("max_packets") represent the total packets available for allocation. Note that max_packets is a constant derived from the total output bandwidth of the multiplexer.

An important aspect of the timing of the bit rate allocation algorithm is that whereas the algorithm is executed immediately at the beginning of each and every time slice, the resulting allocation of packets is not applied to the multiplexer output until a fixed number of time slices later to account for processing delays. N_TC_AHEAD will refer hereinafter to the fixed number of time slices of processing delay required to execute the bit rate allocation algorithm on a processor. In one preferred embodiment, N_TC_AHEAD is equal to one or two. Additionally, the term "current time slice" used in conjunction with the bit rate allocation will refer hereinbelow to the time slice beginning at the current system time plus the N_TC_AHEAD delay time slices. Accordingly, if "time_now" represents the system clock time at the beginning of a particular time slice, then the results of the bit rate allocation algorithm which executes at a system time of "time_now" would be applied to the output of the multiplexer at a system time equal to time_now+N_TC_AHEAD*Tc.

In step 152 of FIG. 5, the minimum and maximum packets which can be transmitted for channel "i" are computed so that neither an overflow nor underflow of the SMB is encountered. The minimum and maximum packets for channel "i" which will ensure that the SMB will not overflow or underflow during the current time slice will be referred to hereinafter as $Smin_{(1)}$ and $Smax_{(1)}$. The computation of $Smin_{(i)}$ and $Smax_{(i)}$ are set forth below. $Smin_{(1)}$ is computed for all channels $(1 \leq i \leq M)$ where "M" is the number of channels and "I" is the channel index, as follows:

$$Smin_{(i)} = \begin{cases} 1 + \text{floor}(((vbv\_size)_{(i)} - freespace_{(i)})/\text{TP\_SIZE}) & \text{if } freespace_{(i)} < vbv\_size \\ 0 & \text{otherwise} \end{cases} \quad \text{Eq. 5A-1}$$

where $freespace_{(i)}$ is the number of bits left unfilled in SMB of channel "I", TP_SIZE is the number of bits in a transport packet, and $vbv\_size_{(i)}$ is the size of the decoder's VBV for channel "i", a parameter which is recoverable from channel "i's" bit stream. The use of the floor function described above assures that $Smin_{(i)}$ is an integer number of transport packets. Note that floor(x) is a function equal to the largest integer in the number x. For example, floor(4.12)=floor (4.51)=floor(4.99)=4. The equation for $Smin_{(1)}$ is to assure that there is at least vbv_size free space (i.e. bits) in the SMB of channel "i" left unfilled. If there is continually $vbv\_size_{(1)}$ bits left unfilled in a channel's SMB at the start of a time slice, then there is no chance of overflow as bits fill into the SMB over the time slice.

The value for $Smax_{(1)}$ is computed for all channels $(1 \leq I \leq M)$ as follows:

$$Smax_{(i)} = \text{floor}((smb\_fullness(i) - SMB\_MIN\_FULLNESS)/TP\_SIZE) \quad \text{Eq. 5A-2}$$

where SMB_MIN_FULLNESS prevents the SMB from being emptied to zero bits, if required by hardware constraints, and $smb\_fullness_{(i)}$ is the number of bits buffered in $SMB_{(i)}$. This equation calculates the number of bits in the SMB less the minimum number of acceptable bits in the SMB. This amount is then divided to TP_SIZE to convert to packets.

Referring now to block 154 of FIG. 5 the algorithm at that block computes the minimum and maximum Packets which may be transmitted for channel "i" for the current time slice without the decoder's VBV underflowing or overflowing. These values will be referred to respectively hereinafter as $Vmin_{(1)}$ and $Vmax_{(i)}$. $Vmin_{(i)}$ and $Vmax_{(i)}$ are computed slightly differently here, in that $Vmin_{(i)}$ is computed for all channels as follows:

$$Vmin_{(i)} = \begin{cases} 0 & \text{if number of pictures in } VBV(i) < \text{or} + Npic \\ 1 + \text{floor}((nbits_{(i)} * Tc)/((DTS_{(i)} - \text{time\_now}_{(i)} - N\_TC\_AHEAD * Tc) * \text{TP\_SIZE}) & \text{otherwise} \end{cases} \quad \text{Eq. 5B-1}$$

where I is the channel index with $(1 \leq i \leq M)$, $nbits_{(i)}$ is the number of bits in the outgoing picture of the $SMB_{(i)}$ for the current time slice plus the number of bits in the next outgoing picture, $DTS_{(i)}$ is the decoding time stamp of the outgoing picture of SMB, $time\_now_{(i)}$ is the current time in the time base of channel "i," and N_TC_AHEAD processing pipeline delay discussed hereinabove. This calculation determines all the bits in the currently outgoing picture, plus the next outgoing picture, and converts to packets. Also, note that $Vmin_{(i)}$ is equal to zero if there are Npic already in the $VBV_{(i)}$, since the $VBV_{(1)}$ will not underflow if there are already Npic pictures buffered. Npic is an adaptation parameter which in one embodiment is equal to 2.

$Vmin_{(i)}$ establishes a rate at which packets must be delivered from $SMB_{(1)}$ to assure that by the time a picture is decoded by the decoder according to its DTS, that the entire picture and the next picture are both buffered in the VBV of the decoder. That is, when the decoder decode a picture according to its DTS time stamp, the entire next picture will have arrived at the VBV of the decoder as long as $Vmin_{(1)}$ is satisfied. The equation for $Vmin_{(1)}$ set forth in the equation 5B-1 above may be derived as follows:

$nbits_{(i)}$ is the amount of bits which will be needed to be transmitted by the time given by the DTS of the next outgoing picture $DTS_{(1)}$. $T_{(i)}$ is the amount of time by which $nbits_{(i)}$ must be emptied from $SMB_{(i)}$ and output from the multiplexer. $T_{(i)}$ is given by:

$$T_{(i)} = (DTS_{(i)} - (\text{time\_now}_{(1)} + N\_TC\_AHEAD * Tc)) \quad \text{Eq. 5B-2}$$

The amount of time given by $T_{(i)}$ in Eq. 5B-2 is the difference in time between the DTS of the outgoing picture for the current time slice $DTS_{(i)}$ for channel "i" and the system time of the current time slice, which is equal to time_now$_{(i)}$+N_TC_AHEAD * Tc as discussed hereinabove.

If all channels are on the same time base (i.e., all encoders are locked to the same system clock), then all time_now for all "i" are identical. This formula implies a bit rate $B_{(i)}$ described by:

$$B_{(1)} = nbits_{(i)}/(DTS_{(i)} - (\text{time\_now}_{(i)} + N\_TC\_AHEAD * Tc)) \quad \text{Eq. 5B-3}$$

The number of bits which would be transmitted over the current time slice for this bit rate is given by multiplying the bit rate by the time period Tc as follows:

$$B_{(1)}*Tc=(nbits_{(1)}*Tc)/(DTS_{(1)}-time_{13}\ now_{(i)}-N\_TC\_{AHEAD} \cdot Tc) \quad \text{Eq. 5B-4}$$

The final step is then to convert this number of bits to transport packets by dividing the number of bits by the size in bits of the transport packet, TP_SIZE, as follows:

$$B_{(1)}*Tc/TP\_SIZE=(nbits_{(i)}*Tc)/((DTS_{(1)}-time\_now_{(i)}-N\_TC\_AHEAD*Tc)*TP\_SIZE) \quad \text{Eq. 5B-5}$$

Note that equations 5B-1 and 5B-5 are identical but for the addition of an adjustment for the 1+floor$_{(x)}$ value.

Referring now to box 156 of FIG. 5 the step illustrated therein uses the results from boxes 152 and 154 to compute the combined minimum and maximum Packets for the multiplexer which satisfies both SMB and VBV underflow and overflow requirements. These values, referred to hereinafter as SVmin$_{(i)}$ and SVmax$_{(i)}$ can be computed as follows:

$$SVmin_{(1)}=\text{maximum of }(Smin_{(1)}, Vmin_{(1)}) \quad \text{Eq. 5C-1}$$

$$SVmax_{(1)}=\text{minimum of }(Smax_{(i)}, Vmax_{(1)}) \quad \text{Eq. 5C-2}$$

Referring now to box 158 of FIG. 5, there is illustrated therein the step of preliminarily assigning SVmin$_{(1)}$ packets to each of the channels as the initial allocation. The number of packets allocated to each channel for the current time slice will be referred to hereafter as "Packets$_{(1)}$". Accordingly, Packets$_{(1)}$=SVmin$_{(i)}$ for all channels ($1 \leq i \leq M$) as shown in box 158 of FIG. 5. After this initial assignment, the bit rate allocation to each of the channels is the absolute minimum required to satisfy each channels' requirements for underflow and overflow of SMB and VBV for the current time slice. These values are then passed on to box 160 which is the first decision point in the algorithm illustrated in FIG. 5. In particular, if the sum of Packets$_{(1)}$ over all channels ($1 \leq i \leq M$) is greater than max_packets, then there is a bandwidth overflow situation. The calculation illustrated in box 160 is the means of detecting a bandwidth overflow condition. It can be noted from box 160 that if a bandwidth overflow condition exists, the algorithm exits the algorithm for other processing as is illustrated at box 162. The algorithm stops if there is a bandwidth overflow condition, and leaves Packets$_{(i)}$ assigned to SVmin$_{(i)}$ for all of channels ($1 \leq i \leq M$), albeit with a bandwidth overflow condition. If, however, the sum of Packets$_{(i)}$ over all channels is less than or equal to max_packets, then the algorithm continues on to process information as is illustrated in box 164. In particular, box 164 illustrates the step of computing the number of leftover Packets after the preliminary allocation illustrated in step 160. The term "AdjustedPacketsLeft" illustrated in box 164 designates the number of leftover Packets after the calculation set forth in step 160. AdjustedPacketsLeft$_{(1)}$ is the initial leftover Packets and is given by:

$$AdjustedPacketsLeft_{(1)}=\text{maxpackets}-\Sigma\ Packets_{(i)},\ (1 \leq i \leq M) \quad \text{Eq. 5F-1}$$

Using the value of AdjustedPacketsLeft$_{(1)}$ as set forth in step 164, step 166 computes a fractional allocation $f_i$ of the leftover packets to each channel. The fractional allocation is set forth as follows:

$$f_i = \frac{Svmax_{(i)} - SVmin_{(i)}}{\Sigma(Svmax_{(i)} - SVmin_{(i)})} \quad (1 \leq i \leq M)$$

The fractional allocation of step 166 allocates a relatively larger portion of the leftover packets to channels which have a relatively larger value of SVmax$_{(i)}$–SVmin$_{(i)}$, because a larger difference between SVmax$_{(1)}$ and SVmin$_{(i)}$ for a channel bit stream implies that the channel can accept relatively more of the leftover packets. Using the results of step 166, the algorithm allocates the leftover packets as set forth below. Beginning with channel "I", define P$_{(1)}$ as follows:

$$P_{(1)}=SVmin_{(1)}+f_{(1)}*AdjustedPacketsLeft_{(1)}-SVmax_{(1)} \quad \text{Eq. 5H-1}$$

If P$_{(1)}$ is greater than zero then the fractional allocation for channel "i" given by f$_{(1)}$ is too large since the result or value of equation 5H-1 exceeds SVmax$_{(1)}$. In this case, Packets$_{(1)}$ is set to SVmax$_{(1)}$ and channel "1" "gives back" the excess packets it cannot use, which in this case is P$_{(1)}$.

If however P$_{(1)}$ is less than or equal to zero, then channel "I" can use all of its allocated packets and Packets$_{(1)}$ is set to $$Packets_{(1)}=SVmin_{(1)}+f_{(1)}*AdjustedPacketsLeft_{(1)} \quad \text{Eq. 5H-2}$$

After Packets$_{(1)}$, has been computed, AdjustedPacketsLeft$_{(2)}$, P$_{(2)}$ and Packets$_{(2)}$ are computed for channel "2". AdjustedPacketLeft$_{(2)}$ represents the leftover Packets adjusted for any given back by channel "1".

Therefore, AdjustedPacketsLeft$_{(2)}$ is computed as follows:

$$AdjustedPacketsLeft_{(2)} = \begin{cases} AdjustedPacketsLeft_{(1)} + P_{(1)}/(1-f_{(1)}) & \text{if } P_{(1)} > 0 \\ AdjustedPacketsLeft_{(1)} & \text{otherwise} \end{cases} \quad \text{Eq. 5H-3}$$

The denominator of the second term of equation 5H-3 is required since the excess packets can be allocated in their entirety for the remaining channels, but the remaining channels' fractional allocation adds up only to (1−f$_{(1)}$). P(2) is computed similarly to 5H-1 as follows:

$$P_{(2)}=SVmin_{(2)}+f_{(2)}*AdjustedPacketsLeft_{(2)}-SVmax_{(2)} \quad \text{Eq. 5H-4}$$

As with channel "1", if P$_{(2)}$ is greater than zero then there are Packets which have been allocated to channel "2" which channel "2" cannot use and therefore Packets$_{(2)}$ is set to SVmax$_{(2)}$. Otherwise, if P$_{(2)}$ is less than or equal to zero, then Packets$_{(2)}$ is given by:

$$Packets_{(2)}=SVmin_{(2)}+f_{(2)}*AdjustedPacketsLeft_{(2)} \quad \text{Eq. 5H-5}$$

The same computations are performed for the rest of the channel ($3 \leq i \leq M$) iteratively. Accordingly, $P_{(i)}$ is computed as:

$$P_{(i)} = SVmin_{(i)} + f_{(i)} * AdjustedPacketsLeft_{(i)} - SVmax_{(i)} \quad \text{Eq. 5H-6}$$

and AdjustedPacketsLeft(i+1) for the next channel is computed as a function of P(i) according to:

$$AdjustedPacketsLeft_{(i+1)} = \begin{cases} AdjustedPacketsLeft_{(i)} + P_{(i)}/(1-\Sigma f_{(i)}) & \text{if } P_{(i)} > 0 \\ AdjustedPacketsLeft_{(i)} & \text{otherwise} \end{cases} \quad \text{Eq. 5H-7}$$

If $P_{(i)}$ is less than or equal to zero then AdjustedPacketsLeft$_{(i+1)}$ is left unchanged from the current channel and Packets$_{(i)}$ is given similarly by equation 5H-2, otherwise Packets$_{(1)}$ is set to SVmax$_{(1)}$. This completes the description of the bit rate allocation with giveback algorithm in accordance with the instant invention. Note, however, that it does not address the means for early detection and prevention of bandwidth overflow in a statistical multiplexer, which will be described in greater detail hereinbelow.

Figure 6:
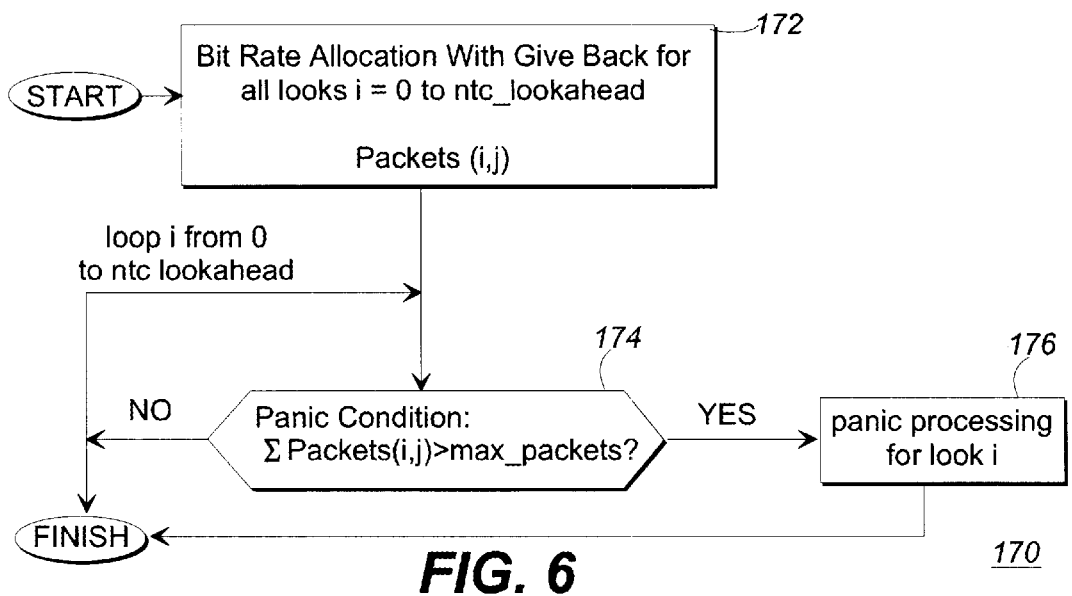
FIG. 6 is a flow diagram illustrating the algorithm used to detect and prevent bandwidth overflow, in accordance with the instant invention.

Referring now to FIG. 6, there is illustrated therein a flow diagram of the algorithm used to detect and prevent bandwidth overflow in accordance with the instant invention. Note that the algorithm illustrated in FIG. 6 is used in concert with the algorithm illustrated hereinabove with respect to FIG. 5. The improved bit allocation algorithm described hereinabove with respect to FIG. 5 determines the bit rate allocation for all channels for one time period Tc, or for one time slice. As described above, if the bit rate requirements for the set of channels for the applicable time slice is such that allocated packets described in steps 164 are not satisfied, then the multiplexer cannot allocate enough bandwidth to provide the minimum required bandwidth to each of the channels. This condition, which will be referred to hereinafter as a "Panic Condition" is defined specifically as when the value of max_packets is less than the sum overall "i" of Packets$_{(1)}$. As a Panic Condition is an undesirable occurrence in the context of a multiplexer, it is highly desirable to detect a Panic Condition early and to prevent an actual bandwidth overflow in the multiplexer. FIG. 6 describes the algorithm for detecting the Panic Condition and preventing bandwidth overflow. Accordingly, and referring to FIG. 6, the flow diagram 170 illustrates at a first step 172 the process of looping over the bit rate allocation algorithm illustrated hereinabove with respect to FIG. 5, for i=0 to ntc_lookahead where "i" is the time slice index starting from the current time slice forward to "n" time slices or "looks" ahead. This produces packets(i,j) for i=0 to ntc_lookahead and for $1 \leq j \leq M$, where j is the channel index. This produces the anticipated bit rate allocation not only for the applicable time slice, but also for a predicted bit rate allocation for ntc_lookahead future time slices.

Thereafter as is illustrated in step 174 of FIG. 6, there is illustrated the step of looping the time slice from 0, i.e., current time slice, to ntc_lookahead and checking to see if a Panic Condition is approaching. If a Panic Condition exists, it will generally be detected in ntc_lookahead+1 time slices earlier, instead of just for the current time slice if the bit allocation were to be executed only once. Accordingly, bandwidth overflow is detected earlier in the process than has heretofore been known. For each "i" (each of the ntc_lookahead+1 time slices for which the bit rate allocation is computed) if there is a Panic Condition then the step illustrated at box 176 of FIG. 6 is implemented. Otherwise, the process illustrated at step 174 of looping "i" over 0 to ntc_lookahead continues to loop until the process is finished.

Figure 7:
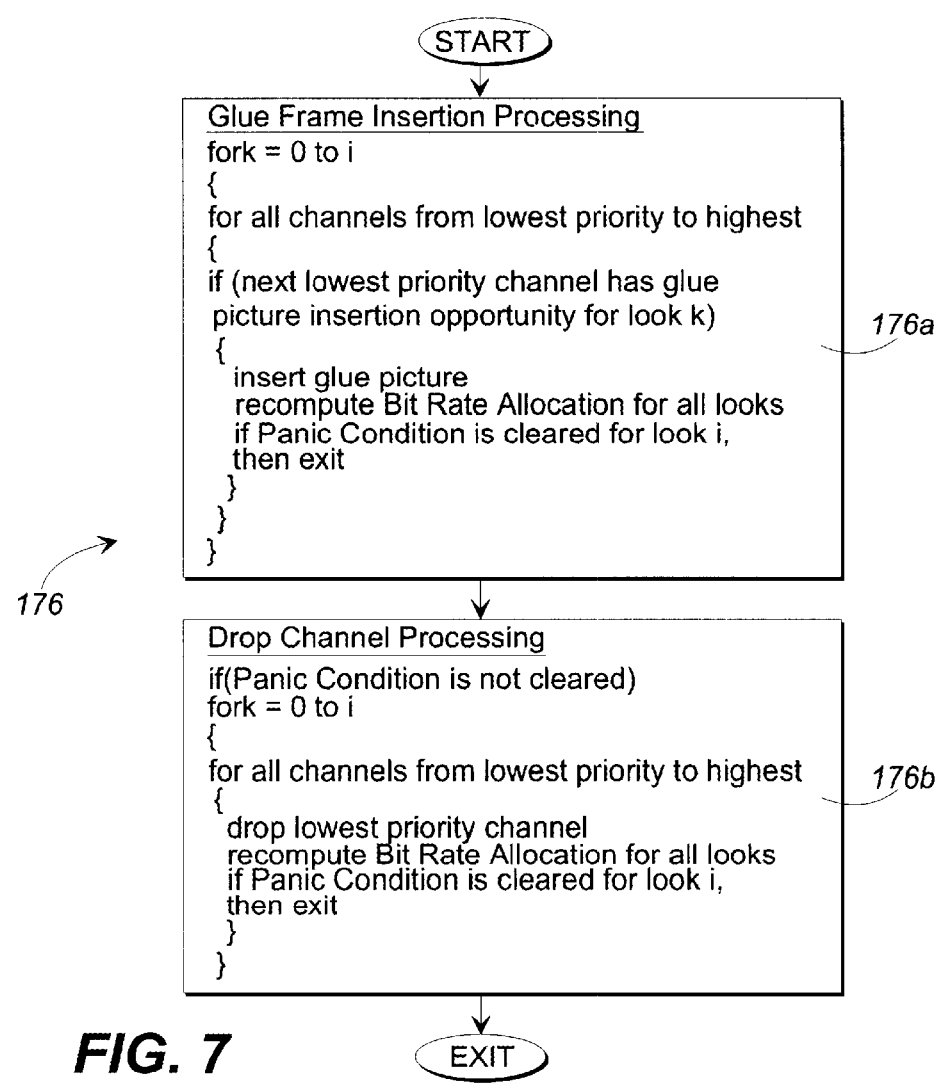
FIG. 7 is a block diagram illustrating in greater detail a portion of the flow diagram of FIG. 6.

The step of panic processing for a look "i" illustrated in box 176 of FIG. 6 is illustrated in greater detail in FIG. 7, which is a block diagram illustrating box 176 of FIG. 6. In particular, the result of the processing described at box 176 is that the Panic Condition is "cleared" meaning it no longer holds after this processing, and bandwidth overflow is thus prevented. In box 176a, lower priority channels having non-anchored pictures in the bitstream are replaced with smaller "glue frame" pictures, thus lowering their bandwidth requirements. Glue frames are understood to be pre-stored replacement pictures for non-anchor pictures (e.g., B-pictures or P-pictures). The pre-stored glue pictures are recorded pictures with zero motion vectors and no coded Discrete Cosine Transform ("DCT") coefficients and are therefore essentially repeat pictures. Glue pictures are therefore smaller than the vast majority of the non-anchor pictures they are intended to replace.

Step 176a illustrates the process of clearing a panic condition detected for look "i". If there is a panic condition for look "i", this means that the bit rate allocation for "i"th forward predicted time slice has a bandwidth overflow (panic) condition as indicated in FIG. 5 box 160. It follows that a panic condition for look "i" suggests that a bandwidth overflow condition has been detected "i" time slices ahead of time, and the multiplexer has a time window of i+1 time slices (current time slice plus "i" forward predicted time slices) to prevent this condition.

To prevent a bandwidth overflow, the multiplexer will replace non-anchor pictures with glue pictures as necessary to lower the bit rate requirements for the multiplexer over the entire i+1 time slices time window. As will be expanded on later, a glue picture insertion opportunity exists for a particular channel j ($1 \leq =j \leq M$) and a particular forward predicted time slice k ($0 \leq k \leq i$) if the next outgoing picture of the SMB(j) for time slice k is a non-anchor picture. Therefore, glue picture insertion opportunities are determined on a time slice by time slice basis. A larger time window (in terms of number of time slices) therefore affords, in general, a greater number of glue picture insertion opportunities since there are more time slices.

Step 176a consists of an outer loop which consists of looping over predicted time slice intervals 0 to "i", which is a time window of i+1 time slices. For each time slice iteration of the loop, the following is performed:

(1) inner loop over all channels, from lowest priority to highest;

(2) if a glue picture insertion opportunity exists for a channel (i.e., next outgoing picture of the channel's SMB is a non-anchor picture), then (a) replace non-anchor picture with glue picture (b) re-compute bit rate allocation algorithm for time slices 0 through "i"

(c) if panic condition is cleared for predicted time slice "i", exit

Note that in step 176a (and as indicated in (b) above), the bit rate allocation algorithm must be re-executed each time a glue picture is inserted, and for the entire i+1 time slices time window. If the panic condition is not removed for look "i" as a result of the glue picture insertion, then the inner loop continues until all channels have been examined for a glue picture insertion opportunity for the particular time slice of the outer loop. Additionally, the outer loop continues to iterate over the i+1 time slices time window until the panic condition for look "i" is cleared.

If an insufficient number of glue frame opportunities present themselves and hence the Panic Condition is not cleared in step 1761, FIG. 7 then proceeds to step 176*b.b* In step 176*b*, the process initiates drop channel processing to clear the Panic Condition. Specifically, a lower priority channel is dropped, i.e., its bitstream is not transmitted, in an effort to provide sufficient bandwidth to carry higher priority channels. In the case of a dropped channel, packets are emptied from that channel's SMB but not transmitted from the multiplexer. Lower priority channels continue to be dropped until sufficient bandwidth is available to clear the Panic Condition. In both steps 176*a* and 176*b* bit rate allocation is recomputed over the entire ntc_lookahead+1 time slices time window. Only after the Panic Condition has been cleared will the algorithm exit the Panic Processing mode illustrated in FIG. 7.

Figure 8A:
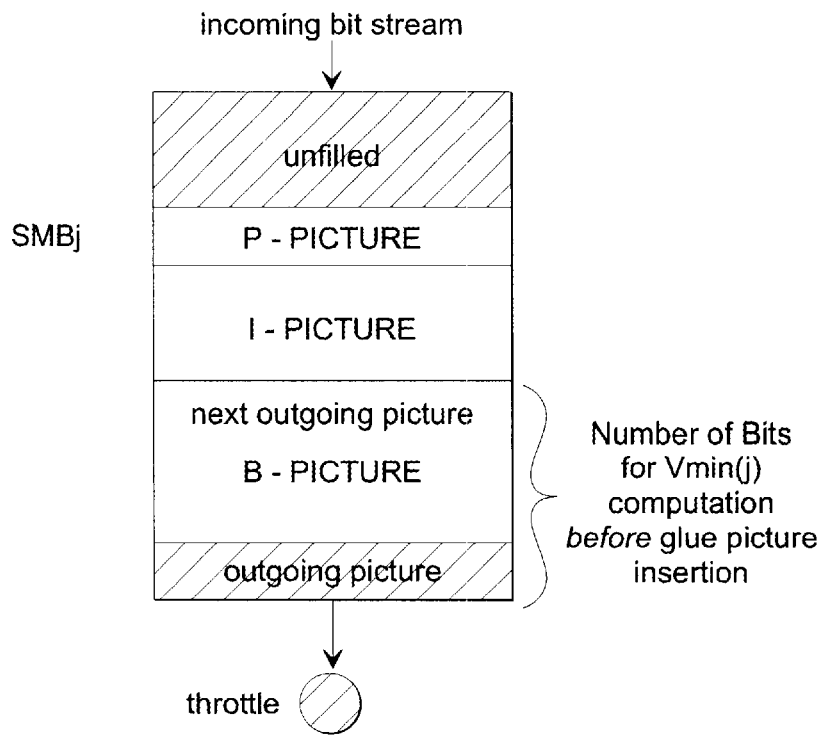
FIGS. 8A and 8B are, respectively, before and after illustrations of bit stream before and after insertion of glue pictures, in accordance with the instant invention.
Figure 8B:
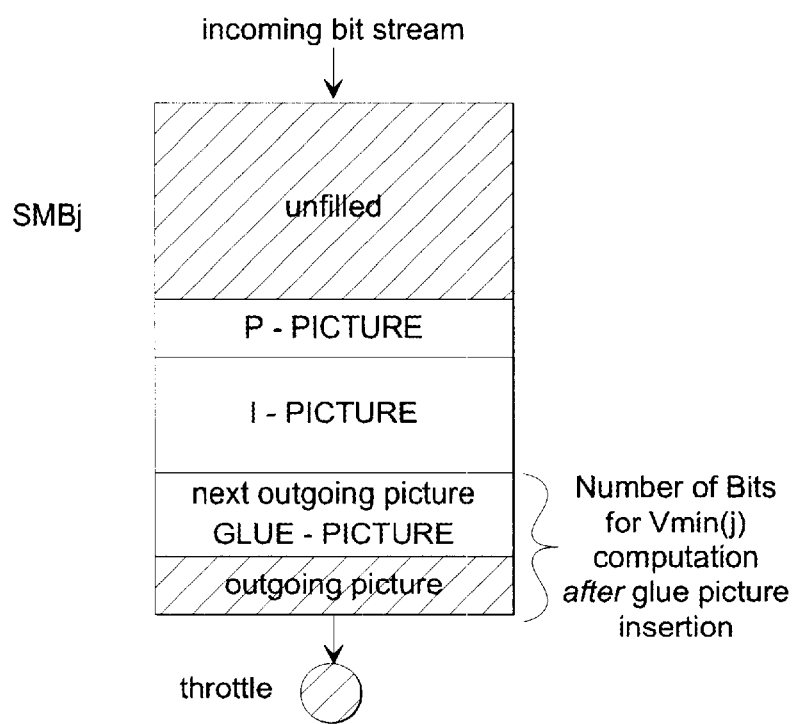

The method in which glue frame opportunities are identified and the specific changes to the bit rate requirements of a channel as a result of glue frame insertion are described in FIGS. 8A and 8B respectively. As explained hereinabove the $Vmin_{(i)}$ computation for channel i is a function of the number of bits in the currently outgoing picture of $SMB_{(i)}$ plus the number of bits in the next outgoing picture. Therefore, if the next outgoing picture may be replaced with a smaller picture, then the total number of bits in the $Vmin_{(i)}$ computation will be smaller, resulting in a smaller $Vmin_{(1)}$. A glue frame opportunity exists for channel "i" if the next outgoing picture in $SMB_{(i)}$ is a non-anchor picture (e.g., any B picture in a n I,B,P sequence of any 1 picture in an all I picture sequence).

If all glue frame replacement opportunities have been exhausted and the Panic Condition still has not been cleared, then lower priority channels are dropped until the Panic Condition is cleared. The channel is dropped by allocating it zero Packets. If channel k is to be dropped then $SVmin_{(k)}$ Packets are emptied from the SMB but not onto the transport bus, where $SVmin_{(k)}$ is as described hereinabove. This implies a loss of signal to the decoder when the multiplexer resumes transmission for channel k, and the channel video is therefore interrupted. Dropping channels is therefore a last resort to be avoided whenever possible.

The foregoing Detailed Description has disclosed to those skilled in the arts to which the invention pertains how to make and use apparatus for outputting a bit stream to avoid overflow or underflow in the receiver. For these reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of determining an output rate at which a bit stream encoded at a variable rate is output to a receiver, the method comprising the steps of:

receiving and storing a plurality of time slices of the bit stream in a memory buffer;

in a processor, determining a bandwidth output requirement for each time slice received;

comparing the bandwidth output requirement with the receiver bandwidth capability; and reallocating bits among said time slices on a time slice-by-time slice basis so that the bandwidth output requirement for each time slice is less than the receiver bandwidth capability.

2. The method set forth in claim 1, wherein the bandwidth output requirement is determined such that the receiver experiences neither an overflow nor an underflow condition.

3. The method set forth in claim 1, wherein the bit stream is a sequence of components, the components having varying lengths and each component including timing information indicating when the receiver must process the component;

the step of determining the output rate is done for a given period of time and comprises the steps of determining a minimum rate such that the component is output from the queue before the receiver must process the component; and determining a maximum rate such that the total size of the components in the set of the components that have been sent to but not yet processed by the receiver does not exceed the size of the bit buffer in the receiver of the model.

4. The method set forth in claim 1, wherein the components are digitally-encoded video images.

5. The method set forth in claim 4, wherein the video images are encoded according to the MPEG-2 standard.

6. The method as in claim 1, wherein the bandwidth capability is defined by the size of the memory buffer and a video buffer in said receiver.

7. The method as in claim 1, wherein the step of dynamically recoding bits among said time slices comprises the further step of calculating a bit stream fractional allocation.

8. The method as in claim 7, wherein the fractional allocation ($f_i$) is calculated according to the following formula:

$$f_i = \frac{SV_{max_i} - SV_{min_i}}{\Sigma(SVmax_i - SVmin_i)}.$$

9. The method as in claim 1, wherein the step of comparing comprises the further step of comparing bandwidth output requirements versus bandwidth capability for a plurality of future time slices.

10. The method as in claim 9, wherein said portion replaced by a pre-stored frame is selected from at least one of a plurality of channels of information having a glue frame opportunity.

11. The method as in claim 10, including the further step of evaluating said channels on a lowest to highest priority basis to identify said glue frame opportunities.

12. The method as in claim 11, including the further step of dropping channels if no glue frame opportunities are identified.

13. The method as in claim 12, wherein channels are dropped in lowest to highest priority order.

* * * * *

UNITED STATES PATENT AND TRADEMARK OFFICE
CERTIFICATE OF CORRECTION

PATENT NO. : 6,411,602 B2  
DATED : June 25, 2002  
INVENTOR(S) : Schoenblum et al.

It is certified that error appears in the above-identified patent and that said Letters Patent is hereby corrected as shown below:

Column 9,  
Line 31, delete "$Smin_{(1)}$" and insert therefore -- $Smin_{(i)}$ --  
Line 31, delete "$Smax_{(1)}$" and insert therefore -- $Smax_{(i)}$ --  
Line 50, delete "$Smin_{(1)}$" and insert therefore -- $Smin_{(i)}$ --  
Line 53, delete "$vbv\_size_{(1)}$" and insert therefore -- $vbv\_size_{(i)}$ --  
Line 56, delete "$Smax_{(1)}$" and insert therefore -- $Smax_{(i)}$ --

Column 10,  
Line 6, delete "$Vmin_{(1)}$" and insert therefore -- $Vmin_{(i)}$ --  
Line 25,, delete "$VBV_{(1)}$" and insert therefore -- $VBV_{(i)}$ --  
Line 29, delete "$SMB_{(1)}$" and insert therefore -- $SMB_{(i)}$ --  
line 42, delete both occurrences of "$VMIN_{(1)}$" and insert therefore in each place -- $Vmin_{(i)}$ --  
Line 46, delete "$DTS_{(1)}.$" and insert therefore -- $DTS_{(i)}.$ --  
Line 52, delete "$T_{(i)} = (DTS_{(i)} - (time\_now_{(1)} + N\_TC\_AHEAD * Tc))$ Eq.5B-2" and insert therefore -- $T_{(i)} = (DTS_{(i)} - (time\_now_{(1)} + N\_TC\_AHEAD * Tc))$ Eq.5B-2 --  
Line 67, delete "$B_{(i)} = nbits_{(i)}/DTS_{(i)} - (time\_now_{(i)} + N\_TC\_AHEAD *Tc)$ Eq. 5B-3" and insert therefore -- $B_{(i)} = nbits_{(i)}/(DTS_{(i)} - (time\_now_{(i)} + N\_TC\_AHEAD*Tc)$ Eq. 5B-3 --

Column 11,  
Line 5, delete "$B_{(i)} * Tc = (nbits_{(i)} *Tc)/DTS_{13} - time\_now_{(i)} + N\_TC\_AHEAD *Tc)$ Eq. 5B-4" and insert therefore -- $B_{(i)} * Tc = (nbits_{(i)} *Tc)/(DTS_{(i)} - (time\_now_{(i)} + N\_TC\_AHEAD*Tc)$ Eq. 5B-4 --  
Line 11, delete "$B_{(i)} *Tc/TP\_SIZE = (nbits_{(i)} *Tc)/((DTS_{(i)} - time\_now_{(i)} - N\_TC\_AHEAD*Tc/TP\_SIZE$ Eq. 5B-5" and insert therefore -- "$B_{(i)} *Tc/TP\_SIZE = (nbits_{(i)} *Tc)/((DTS_{(i)} - time\_now_{(i)} - N\_TC\_AHEAD*Tc)*/TP\_SIZE$ Eq. 5B-5 --  
Line 23, delete "$SVmin_{(i)} = $ maximum of $(Smin_{(i)}, Vmin_{(l)}$ Eq. 5C-1" and insert therefore -- $SVmin_{(l)} = $ maximum of $(Smin_{(i)}, Vmin_{(i)})$ Eq. 5C-1 --  
Line 24, delete "$SVmax_{(1)} = $ minimum of $(Smax_{(i)}, Vmax_{(i)}$ Eq. 5C-2" and insert therefore -- $SVmax_{(i)} = $ minimum of $(Smax_{(i)}, Vmax_{(i)}$ Eq. 5C-2 --  
Line 27, delete "$SVmin_{(1)}$" and insert therefore -- $SVmin_{(i)}$ --  
Line 30, delete "$Packets_{(l)}$"." and insert therefore -- "$Packets_{(i)}$" --  
Line 31, delete "$Packets_{(l)} = SVmin_{(i)}$" and insert therefore -- $Packets_{(i)} = SVmin_{(i)}$ --  
Line 38, delete "$Packets_{(l)}$" and insert therefore -- $Packets_{(i)}$ --

UNITED STATES PATENT AND TRADEMARK OFFICE
CERTIFICATE OF CORRECTION

PATENT NO. : 6,411,602 B2
DATED : June 25, 2002
INVENTOR(S) : Schoenblum et al.

It is certified that error appears in the above-identified patent and that said Letters Patent is hereby corrected as shown below:

Column 12,
Line 11, delete "$SVmax_{(1)}$" and insert therefore -- $SVmax_{(i)}$ --

Column 13,
Line 2, delete "$P_{(1)}$" and insert therefore -- $P_{(i)}$ --
Line 6, delete "$P_{(l)} = Svmin_{(i)} + f_{(i)} * AdjustedPacketsLeft_{(i)} - SVmax_{(l)}$ Eq. 5H-6" and insert therefore -- $P_{(i)} = SVmin_{(i)} + f_{(i)} * AdjustedPacketsLeft_{(i)} - SVmax_{(i)}$ Eq. 5H-6 --
Line 19, delete "$Packets_{(l)}$" and insert therefore -- $Packets_{(i)}$ --
Line 19, delete "$SVmax_{(1)}$." and insert therefore -- $SVmax_{(i)}$. --
Line 42, delete "$Packets_{(l)}$." and insert therefore -- $Packets_{(i)}$. --

Column 15,
Line 32, delete "$Vmin_{(1)}$." and insert therefore -- $Vmin_{(i)}$. --

Signed and Sealed this

Sixteenth Day of September, 2003

JAMES E. ROGAN
*Director of the United States Patent and Trademark Office*